United States Patent [19]

Chirdon et al.

[11] Patent Number: 4,778,369
[45] Date of Patent: Oct. 18, 1988

[54] APPARATUS FOR CHANGING VERTICAL-AXIS EXTRUSION DIES

[75] Inventors: Charles P. Chirdon, Thompson; William J. Granchi, Mentor-On-The-Lake, both of Ohio

[73] Assignee: Essef Corporation, Chardon, Ohio

[21] Appl. No.: 136,949

[22] Filed: Dec. 23, 1987

[51] Int. Cl.$^4$ ............................................. B29C 47/20
[52] U.S. Cl. .................... 425/186; 425/191; 425/192 R; 425/532
[58] Field of Search ............... 425/191, 192 R, 532, 425/185, 186, 62; 248/544; 264/540; 269/55, 900

[56] References Cited

U.S. PATENT DOCUMENTS

| | | | |
|---|---|---|---|
| 1,947,202 | 2/1934 | Homeier | 425/186 X |
| 2,449,625 | 9/1948 | Stuart, 2nd | 425/192 R X |
| 3,321,805 | 5/1967 | Given | 425/192 R |
| 3,561,371 | 2/1971 | Kummer | 425/192 R X |
| 3,680,994 | 8/1972 | Longenecker | 425/191 X |
| 4,394,116 | 7/1983 | Kuenzig et al. | 425/532 X |
| 4,432,718 | 2/1984 | Wurzer | 425/192 R X |

Primary Examiner—Richard L. Chiesa
Attorney, Agent, or Firm—Pearne, Gordon, McCoy & Granger

[57] ABSTRACT

A die changing mechanism for use with a vertical-axis extrusion apparatus that includes a die housing and an extrusion die section, such as an inner section that is secured to the housing by a threaded connection. The apparatus includes a transportable support assembly and a breaker assembly supported by the support assembly and adapted to be positioned in an initial position in rotationally interlocking engagement with the inner die section. The breaker assembly is connected to the support assembly by threaded means, and is adapted for rotational movement relative to the support assembly about a vertical axis corresponding to the screw axis. The pitch of the threads of the threaded means is the same as the pitch of the threads by which the die section is connected to the die housing. When the breaker assembly is positioned in rotationally interlocking engagement with the die section and then rotated in one direction, it unthreads the die section from the housing and simultaneously transfers the weight of the die section to the support assembly.

12 Claims, 6 Drawing Sheets

APPARATUS FOR CHANGING VERTICAL-AXIS EXTRUSION DIES

BACKGROUND OF THE INVENTION

This invention relates to machines for extruding thermoplastic material, and especially to vertical-axis extruding machines for forming an annular column of plastic material that progresses in a downward direction. The column of material is generally known as a parison. More particularly, the invention relates to an apparatus for changing the die sections that are used to form the parison.

In the science of blow-molding hollow plastic articles, a tubular parison is extruded from an extrusion head in a semisoft condition and at an elevated molding temperature. The parison is formed between a pair of closable blow-molding sections movable between open and closed positions and which define an inner surface that conforms to the desired outer surface configuration of the article to be molded.

The mold sections are closed on the parison to form an access opening around a blowing pin at one end of the mold and to pinch off and seal the parison at the other end of the mold. Air under pressure is admitted to the interior of the parison to expand it against the mold surface. When the molded article has cooled, the mold sections are separated and the article is removed.

The tubular parison is formed by extruding the thermoplastic material through an annular die passage defined by a pair of concentric die sections. These include an annular outer die section and a circular inner die section that defines with the outer section the annular extruding passage.

Because the same blow-molding apparatus may be used to form several different types of hollow plastic articles, it is frequently necessary to change the die sections. This is a delicate operation because the die sections weigh several hundred pounds, are usually quite hot, and often have residual plastic material within the extruding passage.

The outer die section is usually mounted by threaded fasteners to the housing of the extrusion apparatus, so it may be removed merely by removing the threaded fasteners while supporting it on a handling apparatus, such as a forklift truck. The inner die section, however, presents different problems, since it usually has a threaded rod on its inner end that is seated in internal threads within the housing. Accordingly, as the inner die section is unthreaded, a vertical clearance must be provided to permit it to move downward until its release, after which it may drop into a handling apparatus.

The inner die section is usually provided with two or more pins that extend downwardly from the lower end of the die section and which may be used to lock the die section to a changing fixture with holes that match the pins. Accordingly, the changing fixture must be engaged with the lower portion of the die section and then rotated to break the thread lock and unthread it from the housing. Because the die sections are extremely heavy, often not, and partly frozen to the housing by partially cured thermoplastic material, die changing has been a difficult and timeconsuming procedure.

The die changing apparatus of the present invention, however, reduces the difficulties indicated above, and affords other features and advantages heretofore not obtainable.

SUMMARY OF THE INVENTION

It is among the objects of the present invention to simplify and reduce the time required to change the extrusion die sections in a blow-molding apparatus.

Another object is to provide a support for the inner die section of a pair of vertical-axis extrusion dies while it is unthreaded from the die housing to avoid releasing it from support after the unthreading is complete.

The present invention provides a die changing mechanism for use with a vertical-axis extrusion apparatus that includes a die housing and an extrusion die section, such as an inner section that is secured to the housing by a threaded connection. The apparatus includes a transportable support assembly and a breaker assembly supported by the support assembly and adapted to be positioned in an intitial position in rotationally interlocking engagement with the inner die section. The breaker assembly is connected to the support assembly by threaded means, and is adapted for rotational movement relative to the support assembly about a vertical axis corresponding to the screw axis. The pitch of the threads of the threaded means is the same as the pitch of the threads by which the die section is connected to the die housing. When the breaker assembly is positioned in rotationally interlocking engagement with the die section and then rotated in one direction, it unthreads the die section from the housing and simultaneously transfers the weight of the die section to the support assembly.

According to one aspect of the invention, the support assembly is provided with means for selecting two or more different pitches for the threaded means to adapt the same mechanism to die sections with different thread forms.

DESCRIPTION OF THE PREFERRED EMBODIMENT

Figure 1:
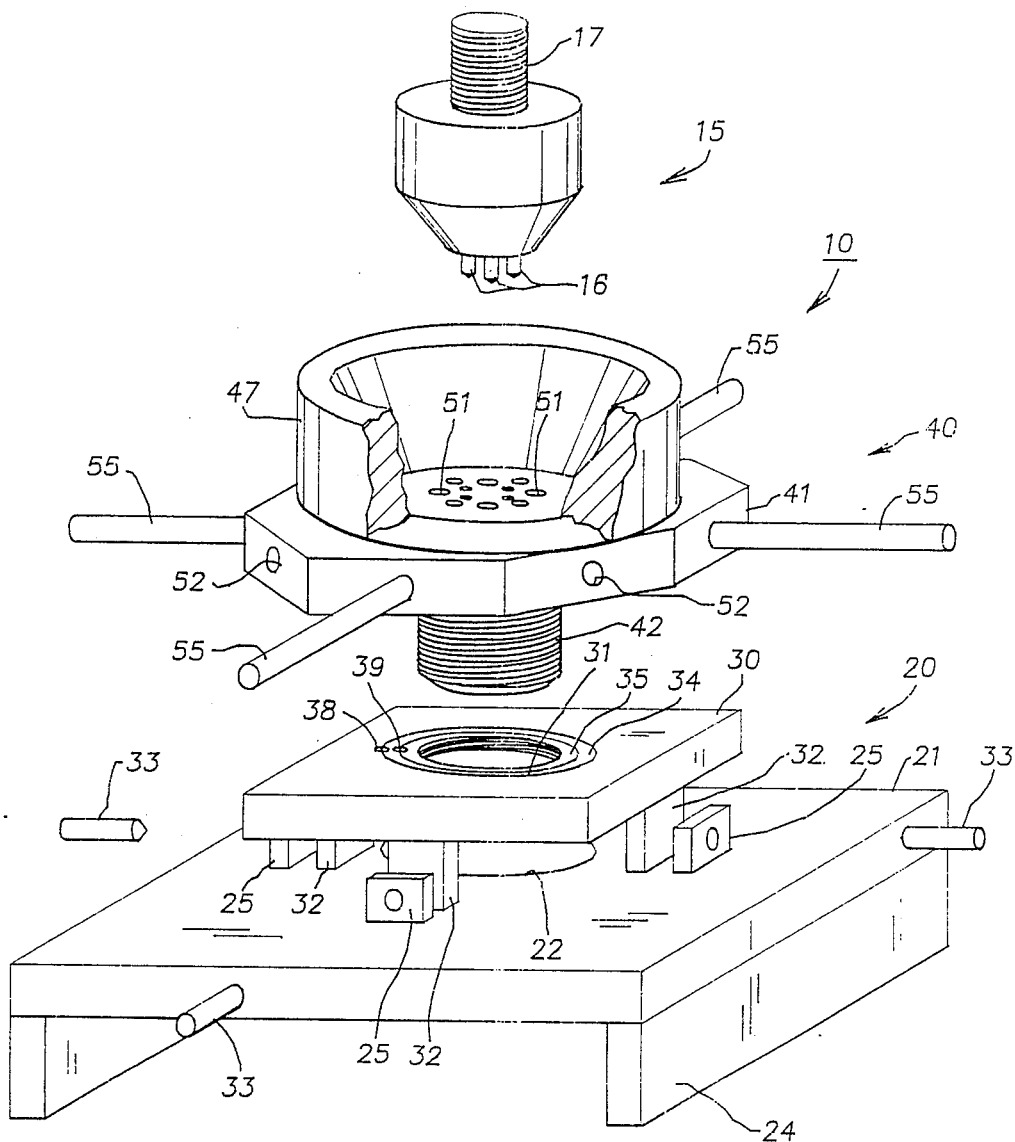
FIG. 1 is an exploded, perspective view of the die changing apparatus of the present invention, with parts broken away and shown in section for the purpose of illustration.
Figure 2:
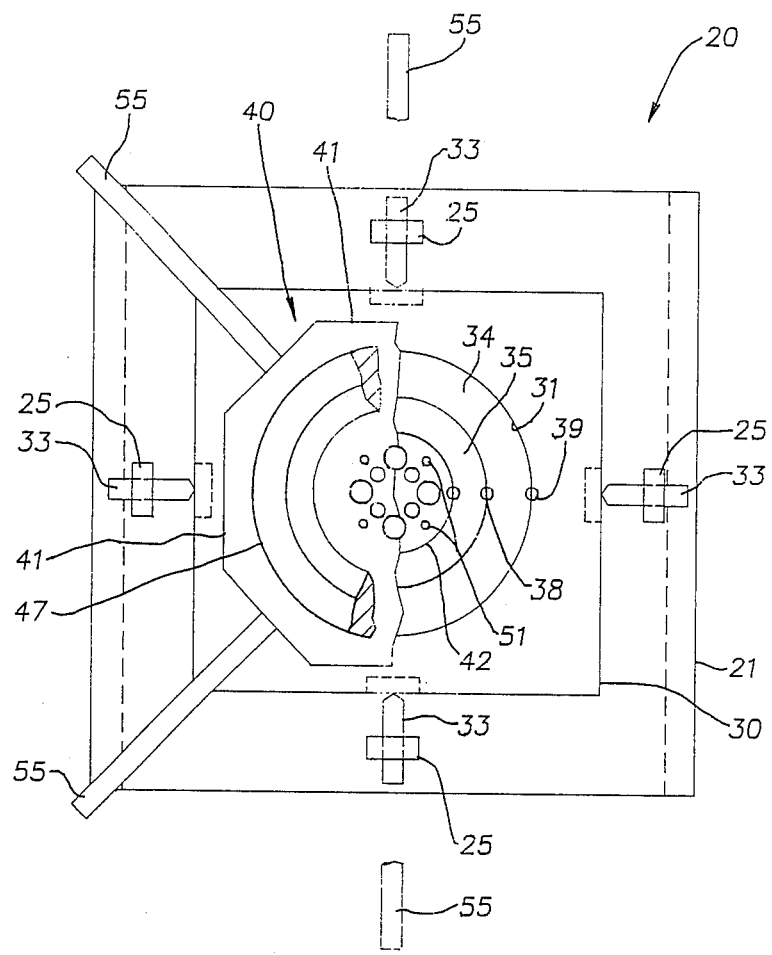
FIG. 2 is a plan view of the die changing apparatus of FIG. 1, with parts broken away for the purpose of illustration.
Figure 3:
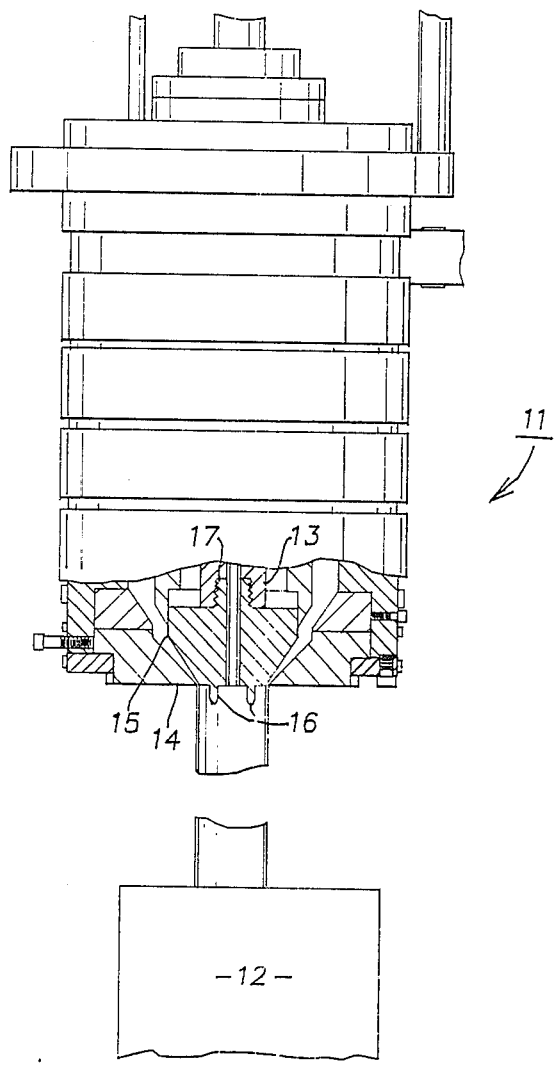
FIG. 3 is an elevational view of a portion of an extrusion machine, including die sections that are adapted to be changed by an apparatus embodying the invention, the changing apparatus being shown in an initial position below the die sections.

Referring more particularly to the drawings, and initially to FIGS. 1, 2, and 3, there is shown a die changing apparatus 10 for changing the inner and outer extrusion die sections of an extruder 11 adapted for use with a blow-molding machine 12. The die changing apparatus is adapted to be used in association with a material handling apparatus, such as a forklift truck which is adapted to lift the apparatus into an approximate position with the vertical axis thereof approximately corresponding to the thread axis by which the inner die section is threaded into the die housing 13 of the extruder 11. The extrusion die sections include an annular outer die section 14 and a circular inner die section 15. The die sections define an annular passage through which thermoplastic material is extruded to form a tubular parison which is received by the cooperating mold halves of the blow-molding machine to form a product.

The innner die section 15 is provided with four downwardly extending locator pins 16 at one end and an upwardly extending threaded stud 17 at the other end. The threaded stud 17 is adapted to be threaded into internal threads formed in the housing 13. In the embodiment shown, the annular passage defined by the die sections has a converging configuration; however, the die changing apparatus may also be used in connection with die sections that define a diverging extrusion passage.

The die changing apparatus 10 includes as its main components a support assembly 20 and breaker assembly 40 mounted above and threadedly connected to the support assembly 20.

The support assembly 20 includes a stationary, rectangular base plate 21 defining a central opening 22. The plate 21 rests on a pair of supporting walls 23 and 24 located on opposite sides. The spacing between the two support walls 23 and 24 is sufficient to permit the fork of a forklift truck to be inserted below the plate, and thus permit the plate to be lifted by the forklift apparatus into an operating position below the die sections 14 and 15.

Four square locator nuts 25 are welded to the top of the base plate 21 uniformly spaced about the central opening 22 for the purpose of final alignment of the breaker assembly with the inner die section in a manner to be described below. A large, square plate 30 defining a central opening 31 with internal threads is movably supported on the stationary base plate 21 by four legs 32 that are welded to the lower surface of the nut 30 at approximately the center of each of its sides. Thus, the legs are uniformly spaced about the central opening 22 in the base plate 21 and are also approximately aligned with the locator nuts 25 that extend upwardly from the upper surface of the base plate.

Each of the locator nuts 25 receives a setscrew 33 that, in turn, engages one of the legs 32 that support the plate 30. Accordingly, the setscrews 33 may be used to adjust the position of the plate and, correspondingly, of the breaker assembly 40 along two axes so as to facilitate accurate positioning of the breaker assembly relative to the inner die section 15.

The plate 30 has two threadedly connected annular inner pitch selector rings 34 and 35 concentricallly arranged as shown in FIGS. 1 and 2. The selector ring 34 has external threads with a predetermined pitch that engage the internal threads in the opening 31 in the plate 30. Also, the selector ring 35 has a threaded central opening 36. The selector ring 35 has external threads with a different predetermined pitch that engage the internal threads in the opening 36 in the selector ring 35. The selector ring 35 also has a threaded central opening 37.

The selector ring 34 can be locked against rotation relative to the plate 30 by means of a lock screw 38 that is threaded into an interfering position in a threaded bore right at the respective thread circumference. Likewise, the selector ring 35 can be locked against rotation relative to the selector ring 34 by means of a lock screw 39 that is threaded into an interfering position in a bore right at the other thread circumference.

The threads on the stud 17 have still a different predetermined pitch from either of the external threads on the selector rings 34 and 35, and are adapted to engage the internal threads in the threaded opening 37. The stud can be locked against rotation relative to the selector ring 35 by means of a lock screw 44 that is threaded into an interfering position in a bore formed right at the thread circumference.

The breaker assembly 40 includes an octagonal breaker plate 41 and a threaded rod 42 which is secured to the bottom of the breaker plate 41 by machine screws 43. An annular support ring 47 is located coaxially on top of the breaker plate 41 and is adapted to engage and support the annular outer die section 14 when it is removed and replaced by a separate operation.

It will be noted that by removing one of the locking screws 38, 39, and 44, one of the three thread pitches available may be selected to match the pitch of the threads on the stud 17. This feature may be important where the extruder 11 is adapted to accommodate different sets of die sections (e.g., 14 and 15) wherein the pitch of the threads on the respective stud (e.g., 17) may vary from one set to another.

Accordingly, if the locking screw 44 is removed, the pitch of the threads on the rod 42 is selected. If the locking screw 39 is removed, the pitch of the external threads on the selector ring 35 is selected. If the locking screw 38 is removed, the pitch of the external threads on the selector ring 34 is selected.

Selection of the correct pitch to match the pitch of the threads on the threaded stud 17 of the inner die section 15 is essential to the proper operation of the apparatus.

The breaker plate 41 has a plurality of openings formed therein that extend therethrough in an axial direction and through the threaded rod as well, and which are uniformly spaced in the circular pattern corresponding to the pattern of a plurality of locator pins 16 formed in the bottom of the die section 15. The four openings 51 shown are positioned for the particular inner die section 16 shown; however, a second group of openings that extend through the breaker plate and through the threaded rod are provided in order that the same mechanism may be used with different inner die sections having a different size and pattern of locator pins.

Each of the eight sides of the octagonal breaker plate 41 is provided with a radial opening 52 that is adapted to receive one end of a lever rod 55 so that the plate 41 comprises a capstan. Normally, the lever rods are placed in opposite holes 52 in opposite sides of the breaker plate so as to apply the necessary torque to "break" the inner die head 15 loose from the housing 13.

OPERATION

The die changing operation normally begins with the removal of the annular outer die section 14. This is accomplished by placing the die changing apparatus 10 of the invention, by using a forklift or other suitable material handling device, in a position immediately below the die sections 14 and 15 and with the support ring 47 in engagement with the bottom of the outer die section 14. Then, the screws which hold the outer die section in place are loosened or removed to free the section from the housing so that the die section 14 may be carried by the support ring 47. When this is done, the forklift removes the outer die section 14 from the area and then repositions the apparatus below the inner die section 15.

Figure 4:
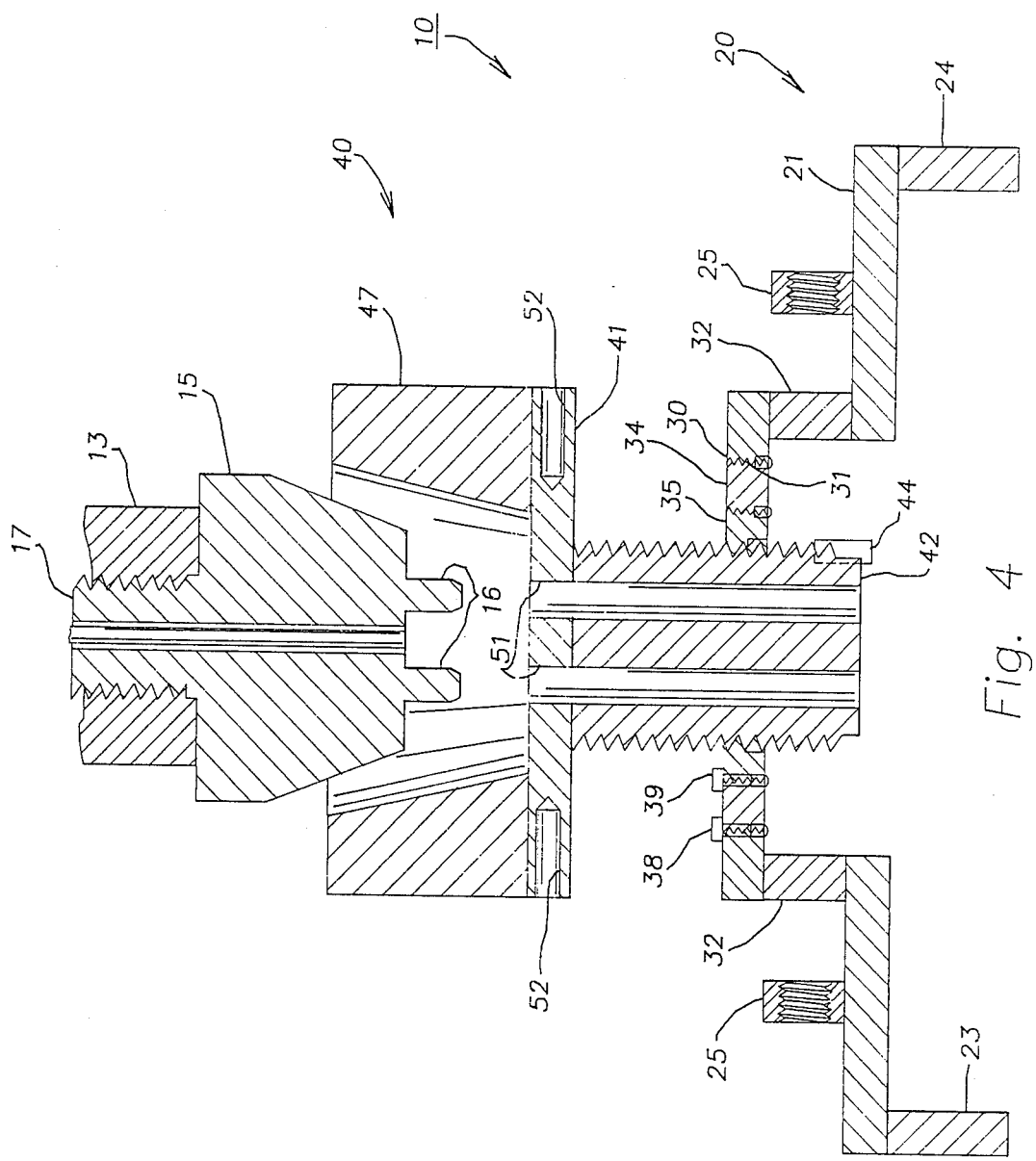
FIGS. 4 through 6 are sectional views illustrating sequentially the steps by which the die section is removed from the housing using the die changing apparatus of the invention.

This is done by lifting the apparatus 10 to a position where the top surface of the breaker plate 41 is below the lower ends of the locator pins 16 on the inner die section (FIG. 4). Before positioning, the threaded rod 42 has been turned in the plate 30 to provide a substantial clearance between the bottom of the breaker plate 41 and the top of the plate. Then, the setscrews 33 are turned to move the plate 30, and thus the breaker plate, along either of two perpendicular axes until the axis of the breaker plate 41 is accurately aligned with the axis of the inner die section 15.

Figure 5:
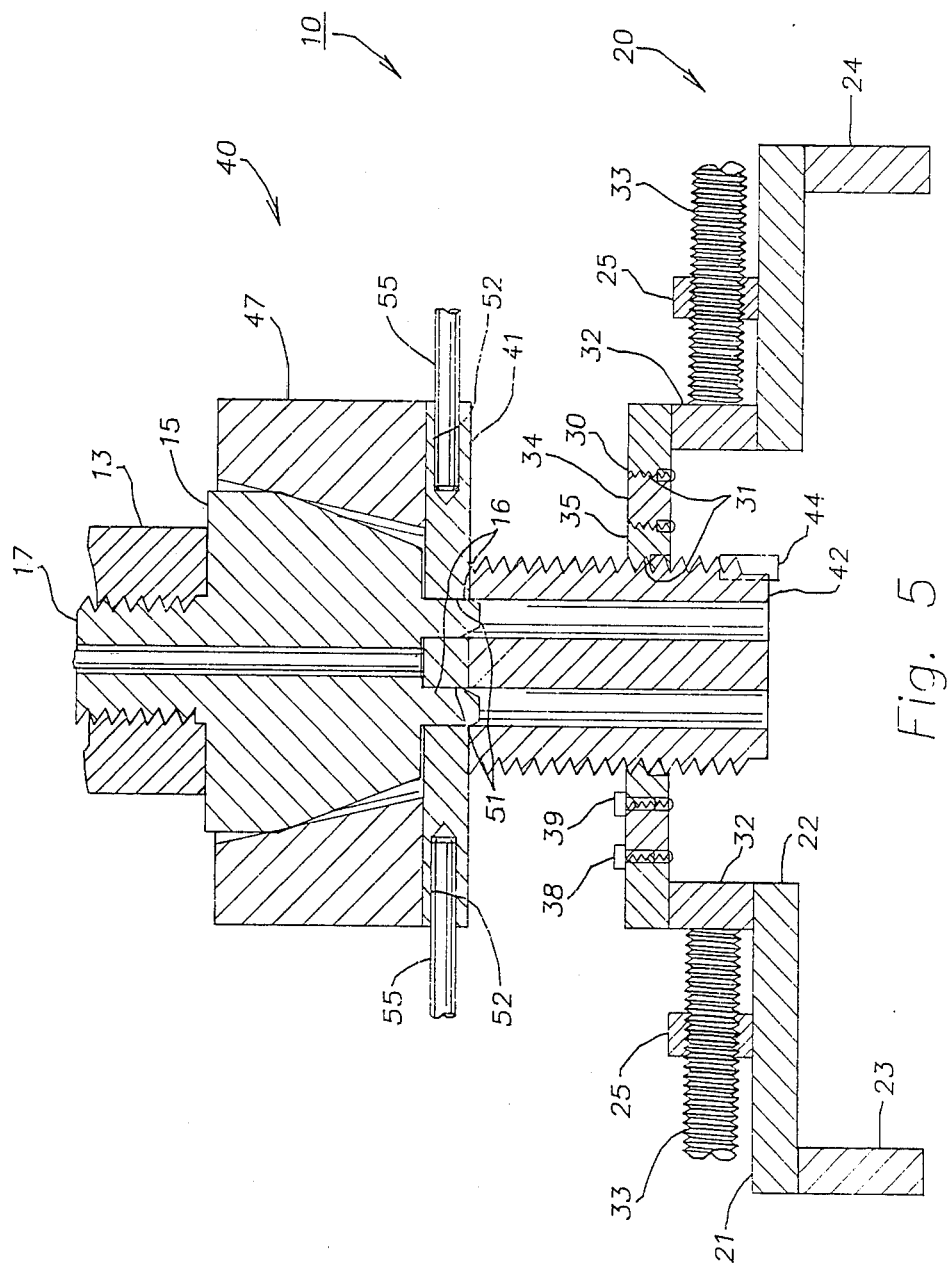

Then, the breaker plate 41 is rotated until the angular orientation of the openings 51 corresponds to the angular orientation of the pins 16. The die changing apparatus is then raised by the fork lift so that the pins 16 move into the respective openings 51 to rotationally lock the breaker plate to the inner die section 15 (FIG. 5).

When this is accomplished, one or more pairs of lever rods 55 are inserted in the opposite radial openings 52, as is convenient, and the breaker plate 41 is rotated to break the inner die section free from the housing. The continued rotation of the breaker plate not only unthreads the inner die section 14 but also threads the threaded rod 42 downward through the nut 30.

Because the pitch of the threads on the threaded stud 17 is the same as the pitch of the threaded rod 42, the breaker assembly 40 progresses downwardly during the unthreading movement at the same rate that the inner die section 14 progresses downwardly as it is unthreaded from the housing 13.

Figure 6:
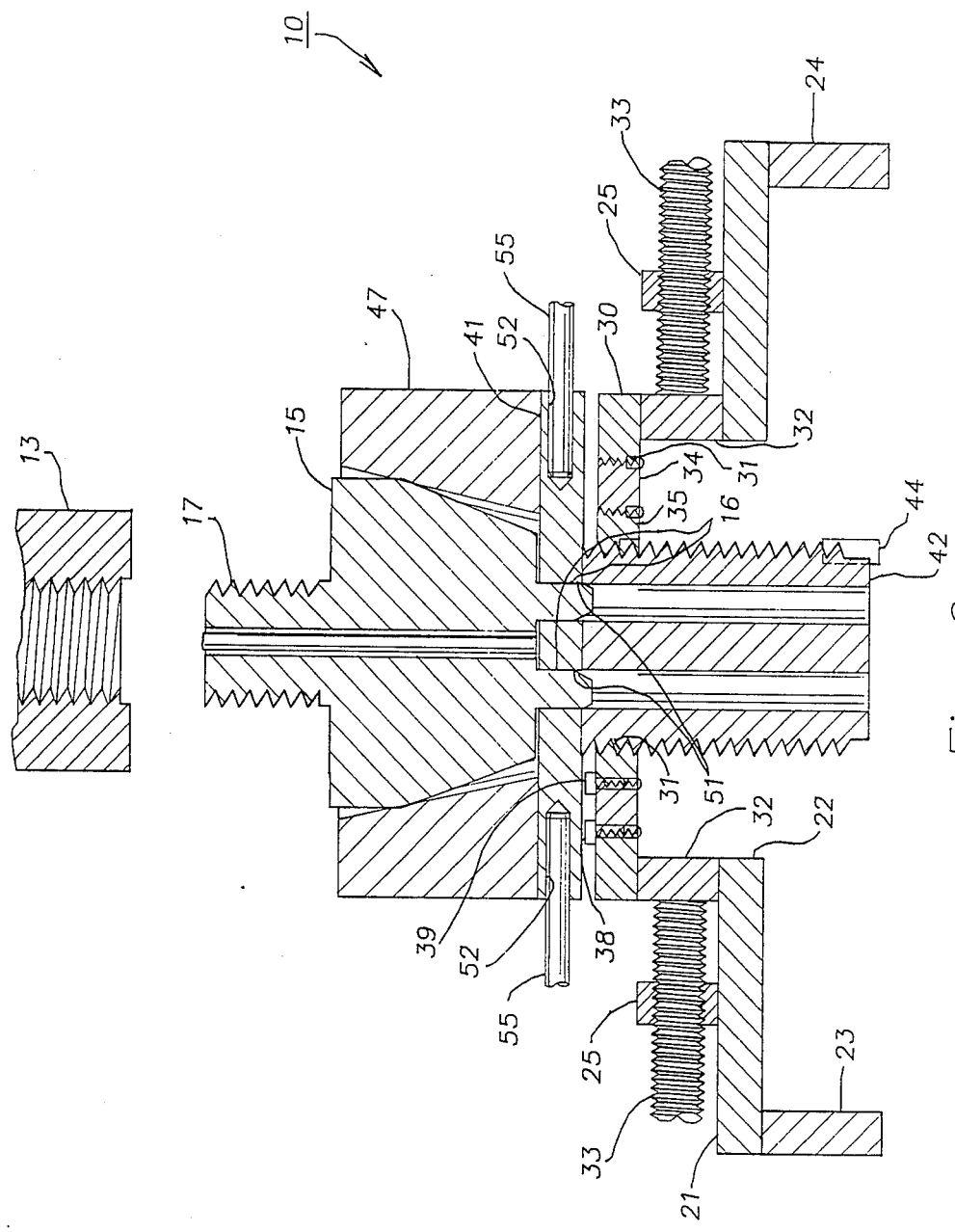

When the unthreading of the inner die section is complete, so that it is disconnected from the housing 13 (FIG. 6), the forklift carries the die section and the changing apparatus to a desired storage location. Another changing apparatus is used to place another outer die section 14 and inner die section 15 in the housing, using a reverse procedure from that used in removal.

The support ring is preferably fabricated from a relatively soft, heat-conducting material which will not scratch or score the inner die section 14 and will serve to dissipate heat from the die section. Aluminum is a preferred material for this purpose. The die section 14 may be stored for later use in its own support ring to protect its surface.

While the invention has been shown and described with respect to a specific embodiment thereof, other variations and modifications of the specific device herein shown and described will be apparent to those skilled in the art, all within the intended spirit and scope of the invention. Accordingly, the patent is not to be limited in scope and effect to the specific embodiment herein shown and described, nor in any way that is inconsistent with the extent to which the progress in the art has been advanced by the invention.

What is claimed is:

1. A die changing mechanism for a vertical extrusion apparatus that includes a die housing and an extrusion die section connected to said housing by first threaded means having helical threads formed about a vertical screw axis, comprising:
    a transportable support assembly;
    a breaker assembly supported by said support assembly and adapted to be positioned in rotationally interlocking engagement with said die section;
    second threaded means connecting said breaker assembly to said support assembly for rotational movement relative thereto about a vertical axis corresponding to said screw axis when said breaker assembly is in its engaged position, the pitch of the threads of said first and second threaded means being the same;
    whereby rotation of said breaker assembly when in its engaged position, in one direction unthreads said die section from said housing and simultaneously transfers the weight of said die section to said support assembly.

2. A die changing mechanism as defined in claim 1, wherein said second threaded means comprises a vertical rod with external threads secured to said breaker assembly and a horizontal plate with internal threads located on said support assembly and adapted to receive said threaded rod.

3. A die changing mechanism as defined in claim 2, wherein said second threaded means further comprises at least one pitch selector ring means threadedly connected to said horizontal plate and concentric therewith, said selector ring means having external threads with a first predetermined pitch that engage internal threads in the horizontal plate and having internal threads with a second predetermined pitch that engage the external threads on said vertical rod,
    and means for selectively locking said selector ring means against rotation relative to said horizontal plate and alternatively relative to said vertical rod,
    whereby the effective pitch to match the pitch of the threads of the first threaded means may be selected from said first and second predetermined pitches.

4. A die changing mechanism as defined in claim 2, wherein said horizontal plate is movably supported on said support assembly for adjustment relative thereto along two perpendicular horizontal axes to permit accurate alignment of said vertical axis of said second threaded means with said screw axis.

5. A die changing mechanism as defined in claim 4, wherein said support assembly includes a base plate and wherein said horizontal plate is movably supported thereon, said base plate having a plurality of upright locator nuts secured thereto adjacent said horizontal plate and a plurality of setscrews threadedly received in said locator nuts and adapted to engage the horizontal plate to adjust its position relative to said screw axis.

6. A die changing mechanism as defined in claim 1, wherein said die section is provided with a plurality of downwardly extending locator pins and wherein said breaker assembly includes a breaker plate with a plurality of openings corresponding to said locator pins whereby when said breaker assembly is positioned with said holes aligned with said locator pins and raised so that said pins enter said holes, said breaker assembly engages said die section and is rotationally locked thereto.

7. A die changing mechanism as defined in claim 6, wherein said breaker plate is provided with a plurality of radial openings opened to receive lever rods for applying torque to said breaker plate to break said die section free from said die housing.

8. A die changing mechanism for a vertical extrusion apparatus that includes a die housing and an extrusion die section connected to said housing by threaded means having helical threads formed about a vertical screw axis so that said die section may be incrementally moved along said vertical screw axis by rotating said die section relative to said housing, comprising:
    a transportable support assembly;

a breaker assembly supported by said support assembly and adapted to be positioned in rotationally interlocking engagement with said die section;

means connecting said breaker assembly to said support assembly for rotational movement relative thereto about a vertical axis corresponding to said screw axis when said breaker assembly is in its engaged position, means responsive to the rotational movement of said breaker assembly to cause said breaker assembly to move along said vertical axis in incremental amounts corresponding to the amount of incremental movement of said die section and corresponding to the direction of movement of said die section:

whereby rotation of said breaker assembly when in its engaged position, in one direction unthreads said die section from said housing and simultaneously transfers the weight of said die section to said support assembly.

9. A die changing mechanism as defined in claim 8, wherein said connecting means is movably supported on said support assembly for adjustment relative thereto along two intersecting horizontal axes to permit accurate alignment of said vertical axis of said connecting means with said screw axis.

10. A die changing mechanism as defined in claim 9, wherein said support assembly includes a horizontal base plate and wherein said connecting means is movably supported thereon, said base plate having a plurality of upright locator nuts secured thereto adjacent said connectiong means and a plurality of setscrews threadedly received in said locator nuts and adapted to engage the connecting means to adjust its position relative to said screw axis.

11. A die changing mechanism as defined in claim 8, wherein said die section is provided with a plurality of downwardly extending locator pins and wherein said breaker assembly includes a breaker plate with a plurality of openings corresponding to said locator pins whereby when said breaker assembly is positioned with said holes aligned with said locator pins and raised so that said pins enter said holes, said breaker assembly engages said die section and is rotationally locked thereto.

12. A die changing mechanism as defined in claim 11, wherein said breaker plate is provided with a plurality of radial openings adapted to receive lever rods for applying torque to said breaker plate to break said die section free from said die housing

* * * * *